3,541,041
MOULD PARTING AGENT FOR POLYAMIDE
MOULDING COMPOSITIONS
Karl Heinz Hermann, Ernst Reichold, and Kurt Schneider, Krefeld-Bockum, Germany, assignors to Farbenfabriken Bayer Aktiengesellschaft, Leverkusen, Germany, a corporation of Germany
No Drawing. Filed Nov. 3, 1967, Ser. No. 680,356
Claims priority, application Germany, Nov. 10, 1966,
F 50,640
Int. Cl. B29f 1/00; C08k 1/44
U.S. Cl. 260—32.6
10 Claims

ABSTRACT OF THE DISCLOSURE

Hydroxyalkylated fatty amines are incorporated into polyamide molding compositions as mould parting agents. These agents can be introduced into the reaction mix used to prepare the polyamide or into the finished polyamide.

---

The present invention relates to a mould parting agent comprising a hydroxyalkylated fatty amine, which mould parting agent is added in the production of polyamides to facilitate removal of the polyamide product from the mould after carrying out a non-cutting shaping process in the molten state.

It is already known that one can add natural or synthetic waxes, fatty acid esters, fatty alcohols or their hydroxyalkylation products, fatty acids or their alkali metal or alkaline earth metal salts, fatty acid nitriles, fatty acid amides or fatty amines to polyamides, as mould parting agents.

These mould parting agents are generally only added to the polyamide reaction product, being either homogeneously mixed with the granular or pulverulent polyamide before the non-cutting shaping process or homogeneously distributed in the molten polyamide by means of suitable mixing apparatuses such as stirrers, kneaders, extruders etc. It is impossible to add the mould parting agent to the polyamide-forming starting materials before polymerisation, in order to avoid the need to add it later, in the case of most mould parting agents, such as the natural or synthetic waxes, fatty acids and their salts or esters, the fatty acid nitriles, the fatty amines etc., because they either undergo decomposition at the temperatures required for polymerisation or react with the carboxyl or amino end groups of the polyamides and thus lose their activity. In addition, some of the mould parting agents hitherto proposed e.g. the fatty alcohols and their hydroxyalkylation products and the fatty acid amides are not sufficiently effective, and some promote the degradation of polyamides after prolonged heating at temperatures above the melting point. This occurs in the case, for example, of fatty acids and their salts.

It has now been found that removal of the polyamide mouldings from the mould after the non-cutting shaping operation from the molten state can be facilitated without the above mentioned disadvantages by using a polyamide moulding material containing as a mold parting agent 0.01 to 10% by weight of an oxalkylated primary or secondary fatty amine of the general formula

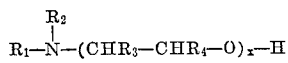

or

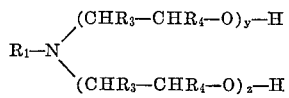

wherein $R_1$ represents a saturated or unsaturated aliphatic radical having at least 12 carbon atoms, $R_2$ represents an alkyl, a cycloalkyl, an aryl or an aralkyl radical, $R_3$ and $R_4$ represent a hydrogen atom or an alkyl radical and $x$, $y$ and $z$ each represent a whole number from 1 to 100.

Examples of compounds which are suitable as mould parting agents according to the invention are hydroxyalkylation products of 1 mol of octadecylamine with 1 to 50 mols of ethylene oxide, of 1 mol of octadecylamine with 1 to 50 mols of propylene oxide, of 1 mol of N-methyl octadecylamine with 1 to 50 mols of ethylene oxide, of 1 mol of N-cyclohexyloctadecylamine with 1 to 50 mols of ethylene oxide, of 1 mol of hexadecylamine with 1 to 50 mols of ethylene oxide, of 1 mol of 1-aminoeicosane with 1 to 50 mols of ethylene oxide, and of 1 mol of 1-aminodocosane with 1 to 50 mols of ethylene oxide. The hydroxyalkylated fatty amines are added to the polyamides or the polyamide-forming starting materials in quantities of 0.01 to 10 and preferably 0.1 to 2% by weight. Owing to their excellent thermal stability and compatibility with polyamides, the mould parting agents may be added to the polyamide-forming starting materials, so that polymerisation may be carried out in known manner batchwise, e.g. in autoclaves, or continuously, e.g. in tube reactors, if desired with the use of water or compounds that split off water as catalysts, or anhydrously using alkaline catalysts.

The mould parting agents may, however, be homogeneously distributed in the polyamides, if desired as concentrates therein, during or after polymerisation, by means of suitable mixing apparatuses such as stirrers, kneaders or extruders.

The polyamides used for the process according to the invention can be prepared by polymerisation or polycondensation both of amino-carboxylic acids or their lactams or of dicarboxylic acids and diamines.

In addition to the mould parting agents, the polyamides may also contain the usual additives such as pigments, dyes, light and heat stabilisers, optical brightening agents, fillers such as glass fibres or asbestos fibres, plasticisers, crystallisation promoters, chain breaking agents etc.

The polyamide molding materials produced according to the invention are particularly suitable for use in the production of parts of complicated shape which are difficult to remove from their mould. For example combs, casings, small bored cylindrical parts, bearing bushes and gear wheels may be produced in this manner. One advantage of the polyamide moulding materials produced according to the invention is that temperatures of the mold of 120° C. and higher may be employed without the risk of difficulties arising in the removal of pointed tips. Owing to the high temperatures of the mold, crystalline tips are formed which have higher tensile strength, compression strength, modulus of elasticity, hardness and abrasion resistance than comparable articles which are produced at lower temperatures of the mold in order to avoid difficulties in removal from the mould.

The following examples are to further illustrate the invention without limiting it.

EXAMPLE 1

Separate 10 kg. portions of caprolactam are polymerised in the usual manner in an autoclave at 270° C. with the addition of 300 g. of aminocaproic acid as catalyst, 40 g. of caproic acid stearylamide as chain-breaking agent, 1 g. of finely ground talcum as crystallisation promoter and 50 g. (0.5%) of different mould parting agents. The finished polyamide melt is then spun into water to form a filament about 3 mm. in diameter, which is chopped up into granules and then freed from monomeric constituents by boiling with water, and dried.

The resulting products are worked up in a conventional plunger type injection moulding machine (e.g. of the type EH 80 of Eckert & Ziegler) under the following conditions:

Injection temperature (temperature of the mass)— 260° C.
Die temperature—250° C.
Injection pressure—800 kg. wt./cm.$^2$
After pressure—800 kg. wt./cm.$^2$
Temperature of the mould—120° C.
Cycle—25 seconds
Including cooling time—7.5 seconds (With some of the products, the cooling time and hence the cycle have to be prolonged.)

The moulded part employed is a circular plate 80 mm. in diameter and 1 mm. wall thickness, which has 6 radially extending reinforcement ribs 2 x 2 mm. in cross-section. In addition, 6 reinforcing ribs in the form of circular arcs of the same cross-section are arranged 2 mm. from the external edge of the plate. The part is formed by injection with a central screw and removed from the mould by means of 7 symmetrically arranged ejector pins.

The mould release force required, which is a measure of the ease of release from the mould, is determined as follows:

A spring situated centrally in the tool presses uniformly against the ejector pins. The spring parts required for ejection is indicated on a scale by a trailing pointer. The spring was so designed that the spring characteristic is represented by a straight line. The force required is in the region of 0 to 30 kg. wt.

The mould release forces found with the use of different mould parting agents and the increase in cooling time required in some cases are summarised in Table I. Experiments Nos. 8 to 15 are comparison tests carried out with known mould parting agents or without mould parting agents at all.

TABLE 1

| Serial No. | Mould parting agent | Relative viscosity of polyamide [1] | Mould release force, kg. wt. | Increase in cooling time in seconds |
|---|---|---|---|---|
| 1 | Octadecylamine and 2 ethylene oxide | 3.06 | 6.0 | 0 |
| 2 | Octadecylamine and 5 ethylene oxide | 3.09 | 5.0 | 0 |
| 3 | Octadecylamine and 10 ethylene oxide | 3.13 | 5.5 | 0 |
| 4 | Octadecylamine and 50 ethylene oxide | 3.10 | 10.0 | 0 |
| 5 | N-methyl-octadecylamine and 8 ethylene oxide | 3.14 | 9.0 | 0 |
| 6 | Octadecylamine and 10 propylene oxide | 3.11 | 10.5 | 0 |
| 7 | Hexadecylamine and 10 ethylene oxide | 3.12 | 7.5 | 0 |
| 8 | Octadecylamine | 2.97 | 10.0 | 7.5 |
| 9 | Behenic acid | 2.95 | 11.0 | 7.5 |
| 10 | Stearic acid nitrile | 3.05 | 10.5 | 2.5 |
| 11 | Calcium stearate | 2.99 | 10.0 | 7.5 |
| 12 | Stearyl alchool | 3.06 | 11.0 | 7.5 |
| 13 | Hydroxyethylation product of 1 mol of stearic acid and 10 mols of ethylene oxide. | 3.04 | 9.0 | 7.5 |
| 14 | Butyl stearate | 3.00 | 11.5 | 12.5 |
| 15 | | 3.09 | 12.0 | 7.5 |

[1] Determined on the 1% solution in m-cresol at 25° C.

EXAMPLE 2

10 kg. portions of polycaprolactam having a relative viscosity of 3.12 (determined as a 1% solution in m-cresol at 25° C.), in granular form, are homegeneously mixed by tumbling with 1 g. of finely ground talcum and 50 g. (0.5%) of different mould parting agents, and then homogenised in a conventional extruder.

The polyamide is extruded as a filament about 3 mm. in diameter, chopped up into granules and dried.

The resulting products are worked up as in Example 1. The mould release forces required with the different mould parting agents and the increase in cooling time, if required, are summarised in Table II.

Experiments Nos. 3–8 are comparison tests with known mould parting agents.

TABLE II

| Serial No. | Mould parting agent | Mould release force, kg. wt. | Increase in cooling time in seconds |
|---|---|---|---|
| 1 | Octadecylamine and 10 ethylene oxide | 7.0 | 0 |
| 2 | N-methyl-octadecylamine and 8 ethylene oxide | 8.5 | 0 |
| 3 | Octadecylamine | 9.0 | 0 |
| 4 | N-methyl-octadecylamine | 11.0 | 2.5 |
| 5 | Behenic acid and 10 ethylene oxide | 15.0 | 7.5 |
| 6 | Calcium behenate | 10.0 | 5.0 |
| 7 | Stearyl alchool | 10.5 | 2.5 |
| 8 | Stearic acid nitrile | 9.5 | 0 |

What we claim is:

1. A polyamide moulding material, containing as a mould parting agent 0.01 to 10% by weight of hydroxyalkylated primary or secondary fatty amine of the general formula

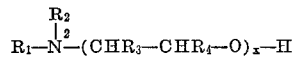

or

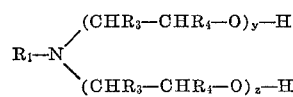

wherein $R_1$ represents a saturated or unsaturated aliphatic radical having at least 12 carbon atoms, $R_2$ represents an alkyl, a cycloalkyl, an aryl or an aralkyl radical, $R_3$ and $R_4$ represent a hydrogen atom or an alkyl radical and $x$, $y$ and $z$ each represent a whole number from 1 to 100.

2. The polyamide moulding material of claim 1, said saturated or unsaturated aliphatic radical $R_1$ being a straight chained radical.

3. The polyamide moulding material of claim 1, said symbols $x$, $y$ and $z$ each representing a whole number from 2 to 50.

4. The polyamide moulding material of claim 1, containing 0.1 to 2% by weight of said hydroxyalkylated primary or secondary fatty amine.

5. The polyamide moulding material of claim 1, said hydroxyalkylated primary fatty amine being a hydroxyethylated octadecyl amine of the formula

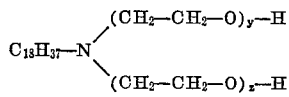

wherein $y$ and $z$ together represent a whole number from 2 to 50.

6. A process for moulding a polyamide in the presence of 0.01 to 10% by weight of a hydroxyalkylated primary or secondary fatty amine of the general formula

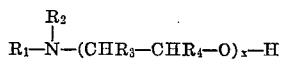

or

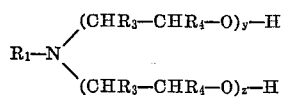

wherein:

$R_1$ represents a saturated or unsaturated aliphatic radical having at least 12 carbon atoms;

$R_2$ represents an alkyl, a cycloalkyl, an aryl or an aralkyl radical;

$R_3$ and $R_4$ represent a hydrogen atom or an alkyl radical; and $x$, $y$ and $z$ each represent a whole number from 1 to 100, which fatty amine acts as a mould parting agent for said polyamide.

7. The process of claim 6, wherein said saturated or unsaturated aliphatic radical $R_1$ is a straight chained radical.

8. The process of claim 6 wherein said symbols $x$, $y$ and $z$ each represent a whole number from 2 to 50.

9. The process of claim 6 wherein 0.1 to 2% by weight of said primary or secondary fatty amine is present.

10. The process of claim 6 wherein said fatty amine is a hydroxyethylated octadecyl amine of the formula

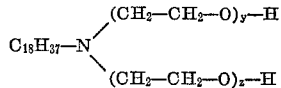

and $y$ and $z$ together represent a whole number from 2 to 50.

References Cited

UNITED STATES PATENTS

| | | |
|---|---|---|
| 3,373,107 | 3/1968 | Rice et al. |
| 3,428,683 | 2/1969 | Swenson et al. |

FOREIGN PATENTS

| | | |
|---|---|---|
| 940,650 | 10/1963 | Great Britain. |

MORRIS LIEBMAN, Primary Examiner

H. H. FLETCHER, Assistant Examiner

U.S. Cl. X.R.

260—78, 584; 264—300

UNITED STATES PATENT OFFICE
CERTIFICATE OF CORRECTION

Patent No. 3,541,041  Dated November 17, 1970

Inventor(s) Karl Heinz Hermann, et al.

It is certified that error appears in the above-identified patent and that said Letters Patent are hereby corrected as shown below:

| Column | Line | Error |
|---|---|---|
| 4 | Table 1 Serial No. 12 | "Stearyl alchool" should read --- Stearyl alcohol --- |
| 4 | Claim 1 Formula | "$\begin{array}{c} R_2 \\ \mid \\ -N^2 \end{array}$" should read --- $\begin{array}{c} R_2 \\ \mid \\ -N- \end{array}$ --- |

SIGNED AND SEALED
MAR 2 1971

(SEAL)
Attest:

Edward M. Fletcher, Jr.
Attesting Officer

WILLIAM E. SCHUYLER,
Commissioner of Pate